United States Patent
Hamilton, II et al.

(10) Patent No.: US 8,250,476 B2
(45) Date of Patent: Aug. 21, 2012

(54) ASYNCHRONOUS IMMERSIVE COMMUNICATIONS IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/327,931

(22) Filed: Dec. 4, 2008

(65) Prior Publication Data

US 2010/0146406 A1 Jun. 10, 2010

(51) Int. Cl.
G06F 3/048 (2006.01)
G06F 3/00 (2006.01)
(52) U.S. Cl. .................................. 715/757; 715/753
(58) Field of Classification Search .................... 715/757
See application file for complete search history.

(56) References Cited

U.S. PATENT DOCUMENTS

| | | | | |
|---|---|---|---|---|
| 5,674,127 | A * | 10/1997 | Horstmann et al. | 463/42 |
| 6,219,045 | B1 * | 4/2001 | Leahy et al. | 715/757 |
| 2009/0100353 | A1 * | 4/2009 | Cradick et al. | 715/757 |
| 2009/0106671 | A1 * | 4/2009 | Olson et al. | 715/757 |

OTHER PUBLICATIONS

WoWWiki: Ritual of Summoning—Archived as of Oct. 18, 2007.*
WoWWiki: Mail—Archived as of Mar. 5, 2008.*
The text of the Postal Service Act of 1792.*
Arnaud et al., "Developing Web Applications with COLLADA and X3D", Mar. 25, 2007, obtained from: (http://www.khronos.org/collada/presentations/Developing_Web_Applications_with_COLLADA_and_X3D.pdf), 6 pages.

* cited by examiner

*Primary Examiner* — Namitha Pillai
*Assistant Examiner* — Matthew Ell
(74) *Attorney, Agent, or Firm* — Hoffman Warnick LLC; William Schiesser

(57) ABSTRACT

The present invention provides asynchronous immersive communication in a virtual universe. In one embodiment, there is a method for transmitting an asynchronous immersive communication in a virtual universe. The method includes receiving an asynchronous immersive communication created by a resident of a virtual universe, transmitting the asynchronous immersive communication to a recipient and enabling the recipient to access the asynchronous immersive communication.

24 Claims, 6 Drawing Sheets

ASYNCHRONOUS IMMERSIVE COMMUNICATIONS IN A VIRTUAL UNIVERSE

TECHNICAL FIELD OF THE INVENTION

This invention relates generally to virtual universes, and more specifically to providing asynchronous immersive communications in a virtual universe.

BACKGROUND OF THE INVENTION

Virtual universes or virtual worlds are computer-based simulated environments intended for its residents to inhabit and interact via avatars, which are personas or representations of the residents of the virtual universes and generally take the form of two-dimensional or three-dimensional human or fantastical representations of a person's self. These types of virtual universes are now most common in massive multi-player on-line games, such as Second Life which is a trademark of Linden Research in the United States, other countries or both. Avatars in these types of virtual universes, which can number well over a million, have a wide range of business and social experiences.

The type of interactions or communications that the residents have through these avatars in these business and social experiences are synchronous. That is, all communications between avatars require the avatars to be in the same virtual space at the same time to convey a given idea. Because the communications are synchronous, there is a limit on the communication experience that can be attained.

SUMMARY OF THE INVENTION

In one embodiment, there is a method for transmitting an asynchronous immersive communication in a virtual universe. In this embodiment, the method comprises: receiving an asynchronous immersive communication created by a resident of a virtual universe; transmitting the asynchronous immersive communication to a recipient; and enabling the recipient to access the asynchronous immersive communication.

In a second embodiment, there is a computer system that transmits an asynchronous immersive communication in a virtual universe. In this embodiment, the system comprises at least one processing unit and memory operably associated with the at least one processing unit. An asynchronous immersive communications tool is storable in memory and executable by the at least one processing unit. The tool comprises a communications receiving component configured to receive an asynchronous immersive communication created by a resident of a virtual universe. The tool further comprises an access coordination component configured to ascertain an access permission designated by the resident for a recipient specified to receive the asynchronous immersive communication. A transmission component is configured to transmit the asynchronous immersive communication to the recipient with the access permission ascertained by the access coordination component.

In a third embodiment, there is a computer-readable medium storing computer instructions, which when executed, enables a computer system to transmit an asynchronous immersive communication in a virtual universe. In this embodiment, the computer instructions comprises receiving an asynchronous immersive communication created by a resident of a virtual universe; transmitting the asynchronous immersive communication to a recipient; and enabling the recipient to access the asynchronous immersive communication.

In a fourth embodiment, there is a method for deploying an asynchronous immersive communications tool for use in a computer system that transmits an asynchronous immersive communication. In this embodiment, a computer infrastructure is provided and is operable to receive an asynchronous immersive communication created by a resident of a virtual universe; transmit the asynchronous immersive communication to a recipient; and enable the recipient to access the asynchronous immersive communication.

DETAILED DESCRIPTION OF THE INVENTION

Figure 1:
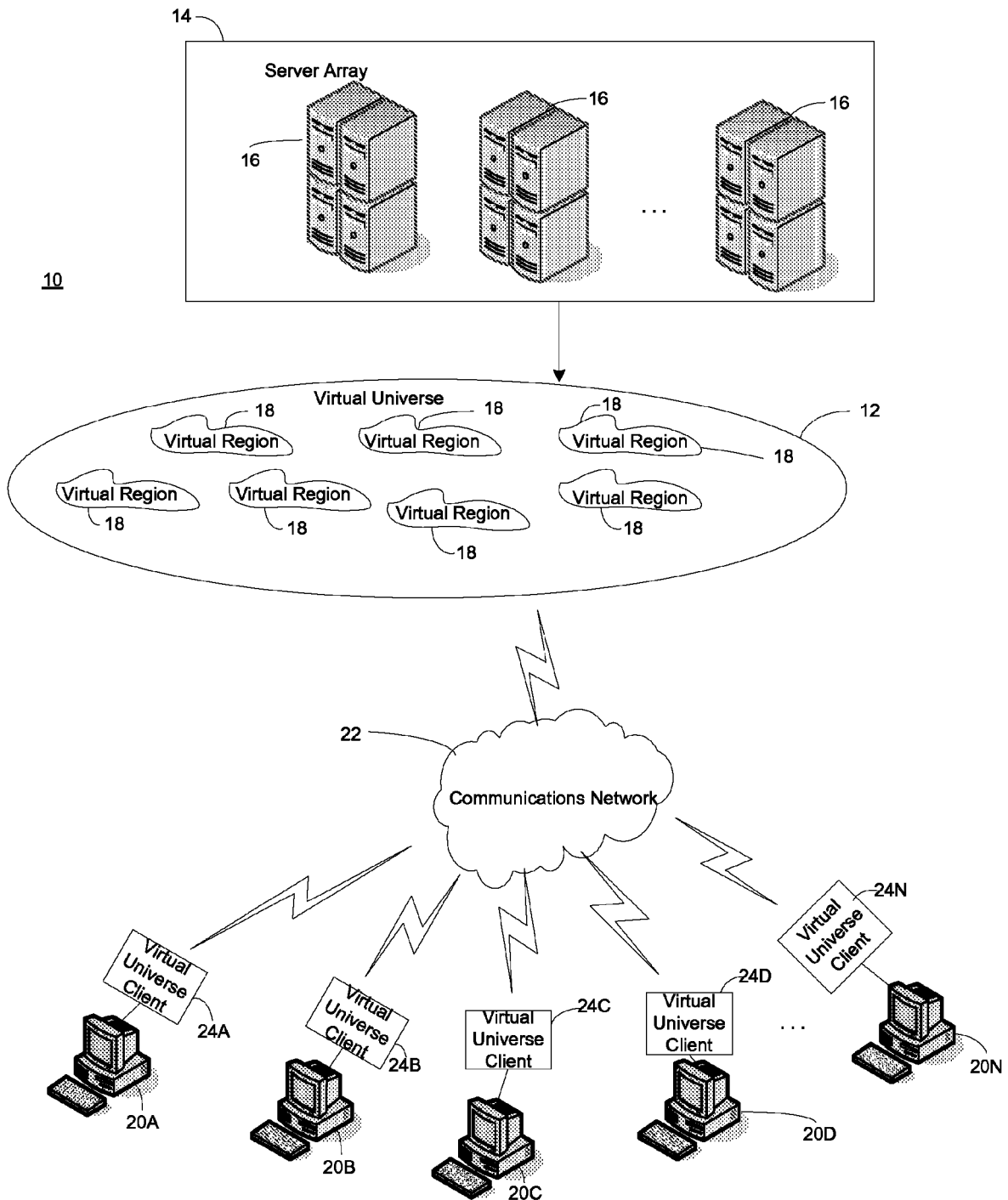
FIG. 1 shows a high-level schematic diagram showing a networking environment for providing a virtual universe according to one embodiment of this invention.

Embodiments of this invention are directed to a technique for providing asynchronous immersive communications in a virtual universe. As used herein, asynchronous immersive communications refer to communications, typically between residents of a virtual universe that may be viewed asynchronously. For example, the asynchronous immersive communication may be generated, transmitted, and stored so that it can be viewed at some time after the creation of the communication. Unlike a movie or other two-dimensional video, the asynchronous immersive communication is typically three-dimensional when sent and received in a virtual universe and may contain avatars (with their software scripts that control their behaviors) and other three-dimensional objects (with their software scripts that control their behaviors) that are lit and shaded and may be viewed from different vantage points.

The asynchronous immersive communication is immersive in that the viewer may, if desired, enter the communication to interact with it, for example, by using his or her avatar to wander around the communication and view it from different angles. It is not simply a three-dimensional rendering, but may also include typical virtual universe operations and features such as the ability to move one's avatar through it (e.g., via a process of teleportation, walking, or flying) and the ability to interrogate and obtain items from the communication and place some of these items in a typical virtual universe inventory. Items in the asynchronous immersive communications have behaviors, as do items in a virtual universe, such as trees that move to give the illusion of wind or pets that bark as controlled by software scripts. Even after the recipient of the asynchronous immersive communication has received and accessed it, and logged off of the virtual universe, the communication may remain in a database for later access and study. If permissions are set appropriately, the immersive communication may be copied and forwarded to others.

Asynchronous immersive communications allow a fuller communication experience for residents that enhances the ability to convey ideas in a comprehensive, in-depth, useful and compelling manner that is not afforded with synchronous communications such as that found with email and instant message communications.

In this invention an asynchronous immersive communications tool is used to facilitate the use of asynchronous immersive communications in a virtual universe. A communications receiving component receives asynchronous immersive communications created by residents of the virtual universe. An access coordination component ascertains the access permissions designated by the residents for their intended recipients of the asynchronous immersive communications. Access permissions will determine how recipients will be allowed to view the asynchronous immersive communications. A transmission component transmits the asynchronous immersive communications to the recipients in accordance with the access permissions. According to embodiments of this invention, there are various approaches in how the transmission component can transmit the asynchronous immersive communications. In particular, the transmission component can generate a teleport invitation to the recipient that will bring the recipient upon acceptance to a specified virtual region within the virtual universe to access the asynchronous immersive communication, place the asynchronous immersive communication in a view port of a virtual universe client that is visually distinguished from a main graphical user interface used by the recipient to access the virtual universe, detach at least one object from the asynchronous immersive communication in the inventories of the recipient that are associated with the virtual universe, place the entire asynchronous immersive communication in the inventories and/or send the communications to the recipients outside of the virtual universe for access thereto.

FIG. 1 shows a high-level schematic diagram showing a networking environment 10 for providing a virtual universe 12 according to one embodiment of this invention in which a tool for conveying asynchronous immersive communications tool can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that reside in the computers, respectively. Below are further details of the virtual universe 12, server array 14, and virtual universe client 24.

Figure 2:
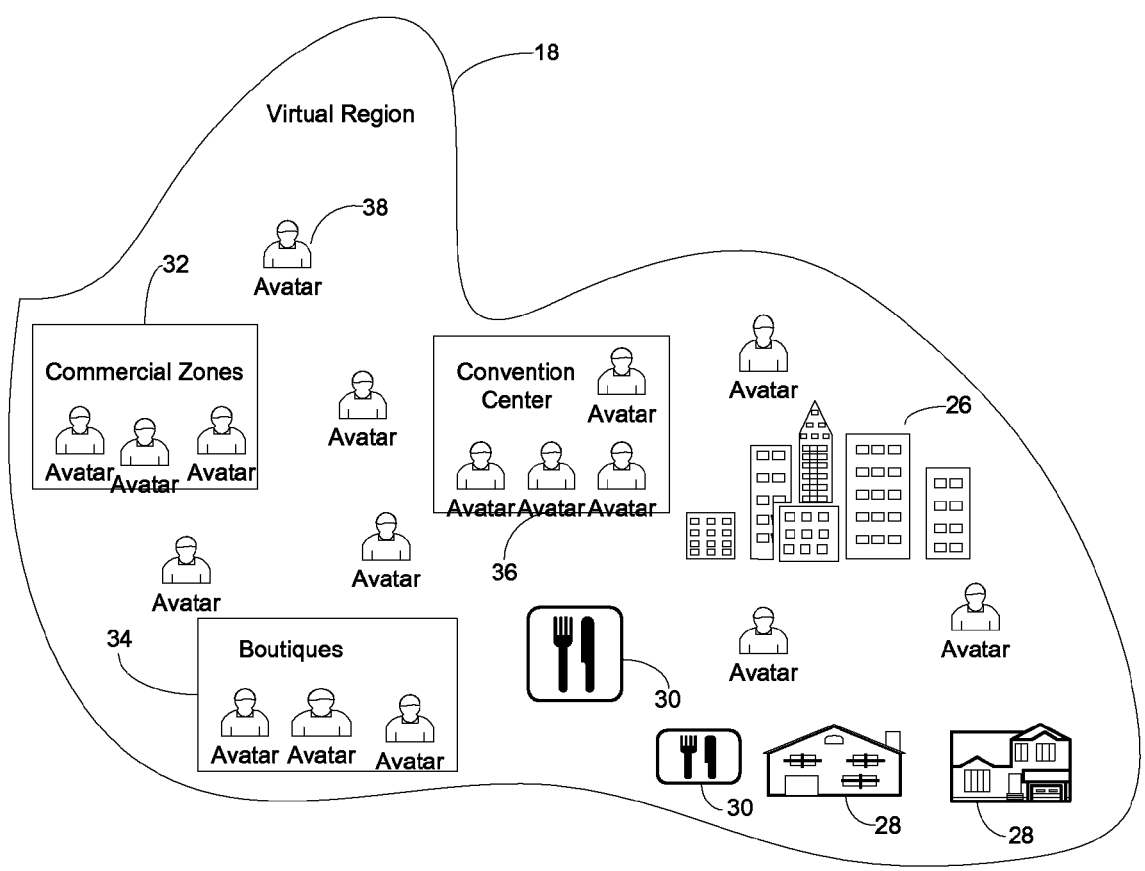
FIG. 2 shows a more detailed view of a virtual region shown in the virtual universe of FIG. 1.

FIG. 2 shows a more detailed view of a virtual region 18 shown in the virtual universe 12 of FIG. 1. As an example, the virtual region 18 shown in FIG. 2 comprises a downtown office center 26, homes 28, restaurants 30 commercial zones 32 and boutiques 34 for shopping and a convention center 36 for meetings and various conventions. Avatars 38, which as mentioned above, are personas or representations of the residents of the virtual universe, roam all about the virtual region by walking, driving, flying or even by teleportation or transportation which is essentially moving through space from one point to another, more or less instantaneously. These examples of items in the virtual region 18 shown in FIG. 2 are only illustrative of some things that may be found in a virtual region and those skilled in the art will recognize that these regions can have many more items that can be found in a real-life universe as well as things that do not presently exist in real life.

Figure 3:
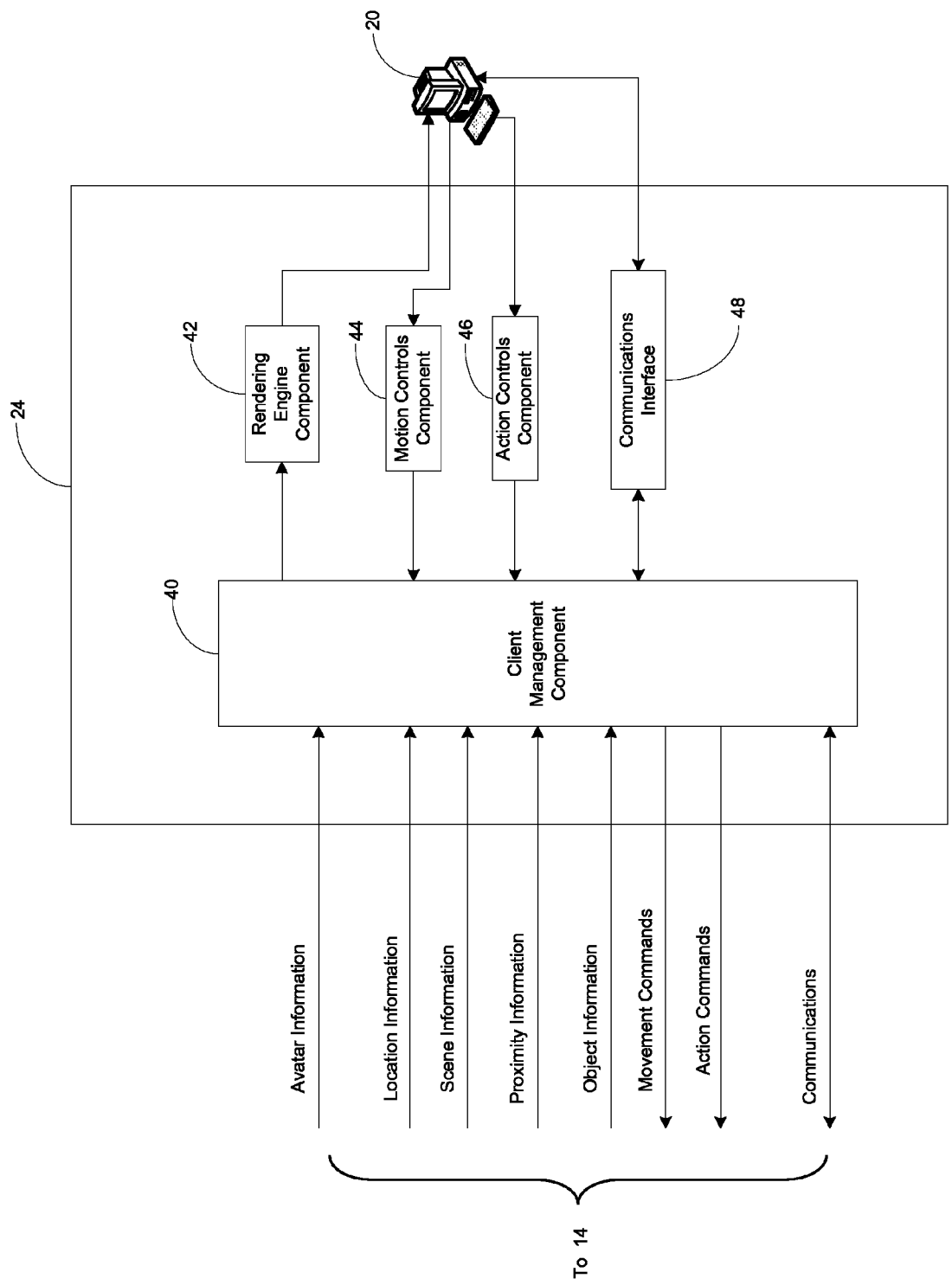
FIG. 3 shows a more detailed view of the virtual universe client shown in FIG. 1.

FIG. 3 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as asynchronous immersive communications, chatting, instant messaging, gesturing, talking and email.

FIG. 3 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 3 also shows the movement commands and action commands that are generated by the user that are sent to the server array via the client management component 40, as well as the communications that can be sent to the users of other avatars within the virtual universe.

Figure 4:
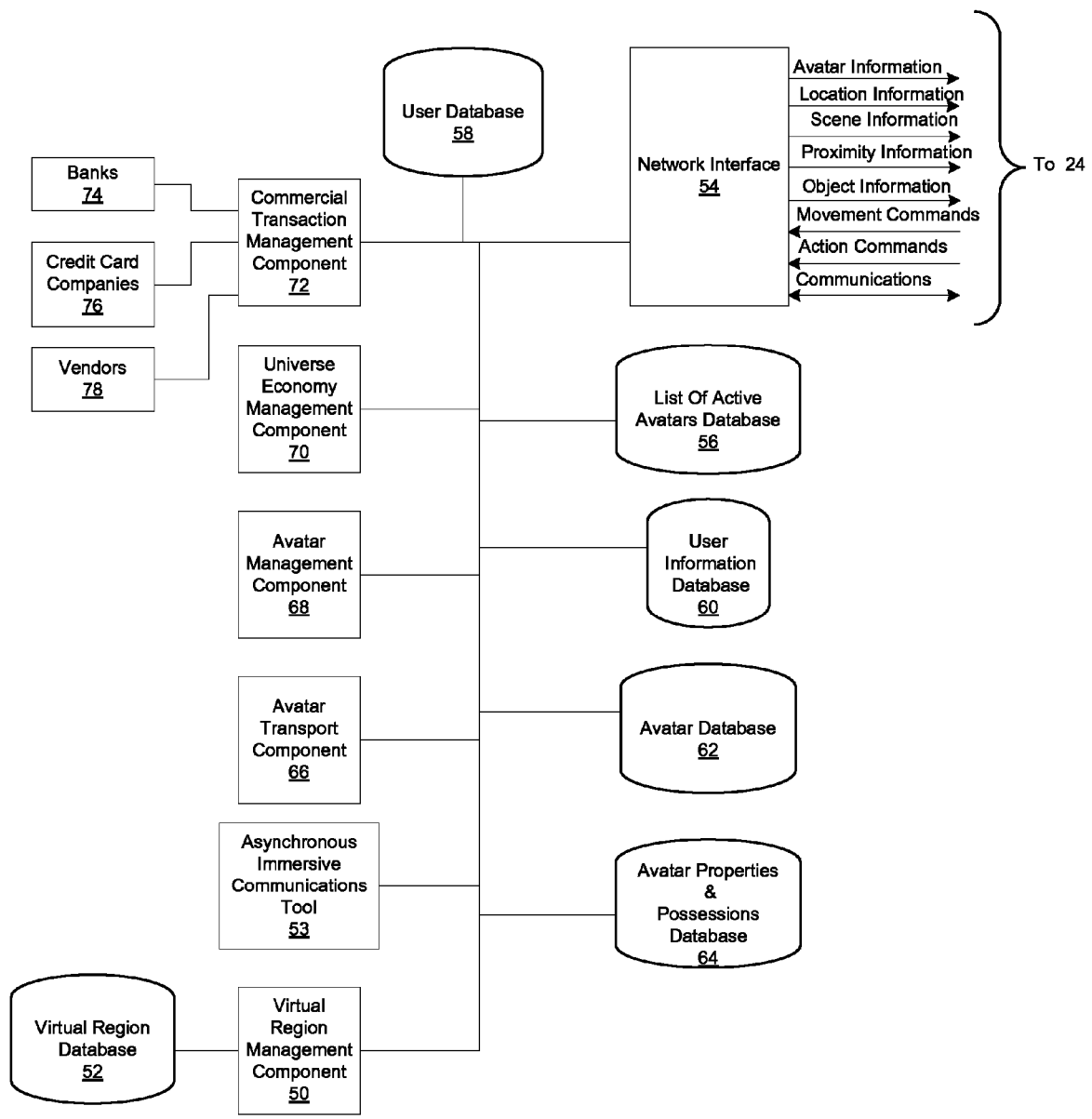
FIG. 4 shows a more detailed view of some the functionalities provided by the server array shown in FIG. 1.

FIG. 4 shows a more detailed view of some the functionalities provided by the server array 14 shown in FIG. 1. In particular, FIG. 4 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

An asynchronous immersive communications tool 53 facilitates the conveyance of asynchronous immersive communications to residents within the virtual universe 12 and even to parties outside of the virtual universe in the form of a two-dimensional version (e.g., a movie). The asynchronous immersive communications tool 53 receives asynchronous immersive communications created by residents of the virtual universe 12 and/or third parties (businesses, service providers) that have a presence in the in virtual universe. The asynchronous immersive communications tool 53 ascertains the access permissions designated by the residents for their intended recipients of the asynchronous immersive communications. The access permissions determine how recipients will be allowed to view the asynchronous immersive communications and can include permissions to access the communications through teleport invitations, inventories of the residents, designated view ports in the virtual universe client 24, and communication channels occurring outside of the virtual universe 12. The asynchronous immersive communications tool 53 transmits the asynchronous immersive communications to the recipients in accordance with the access permissions specified by the residents creating the communications. Below is a more detailed discussion of the asynchronous immersive communications tool 53 and how it provides asynchronous immersive communications within the virtual universe and even in the real-world.

FIG. 4 shows a network interface 54 that enables the server array 14 to interact with the virtual universe client 24 residing on computer 20. In particular, the network interface 54 communicates information that includes information pertaining to avatars, location, scene, proximity and objects to the user through the virtual universe client 24 and receives movement and action commands as well as communications from the user via the universe client.

As shown in FIG. 4, there are several different databases for storing information. In particular, database 56 contains a list of all the avatars that are on-line in the virtual universe 12. Databases 58 and 60 contain information on the actual human users (i.e., the residents) of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the residents that reside in the virtual universe 12. In one embodiment, database 62 contains information such as all of the avatars that a resident may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 4 as being stored in databases, those skilled in the art will recognize that other means of storing information can be utilized.

An avatar transport component 66 enables individual avatars to transport, which allows avatars to transport through virtual space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the resident to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 4, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 5:
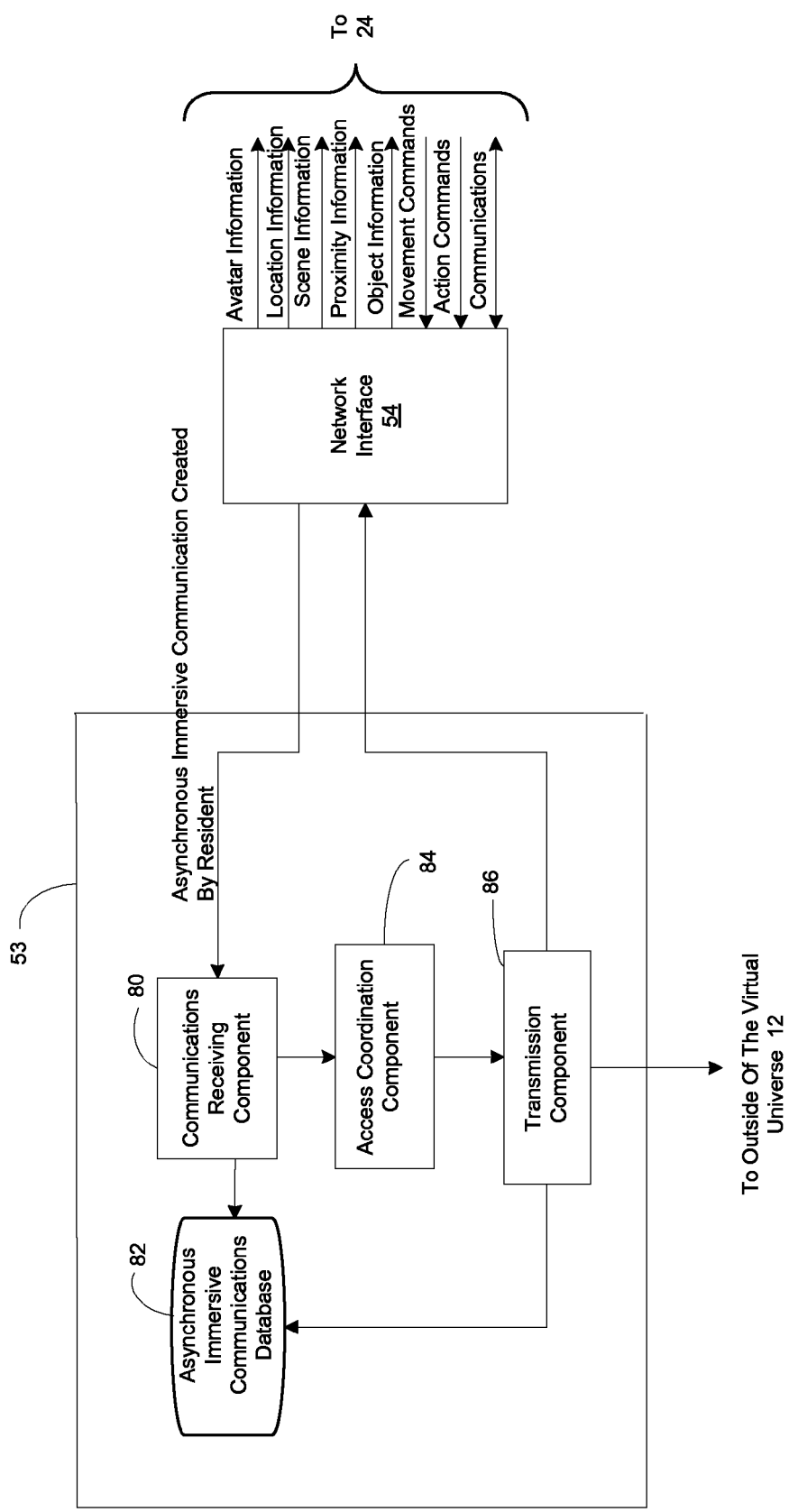
FIG. 5 shows a more detailed view of an asynchronous immersive communications tool according to one embodiment that can operate within the virtual universe shown in FIG. 1.

FIG. 5 shows a more detailed view of the asynchronous immersive communications tool 53 according to one embodiment. As mentioned above, the asynchronous immersive communications tool 53 facilitates the conveyance of asynchronous immersive communications to residents within the virtual universe 12 and even to parties outside of the virtual universe. In one embodiment, as shown in FIG. 5, the asynchronous immersive communications tool 53 is apart of the server array 14 and communicates directly to the virtual universe and its residents via the virtual universe client 24. In other embodiments, the asynchronous immersive communications tool 53 might reside on separate computers in direct communication with the virtual universe servers 16 and virtual universe clients 24. In another embodiment, components of the asynchronous immersive communications tool 53 might reside on both the server array and virtual universe client.

The asynchronous immersive communications tool 53 comprises a communications receiving component 80 that is configured to receive asynchronous immersive communications created by residents of the virtual universe. Asynchronous immersive communications as described above allow a fuller communication experience, along with the ability to convey ideas in a more comprehensive, in-depth, useful, or compelling manner as compared to synchronous communications. For instance, instead of merely sending a chat about one's feelings concerning an architectural design, a resident can transmit a communication through their avatar that may be dressed in a serious manner but gesticulating in an emotional manner in reaction to some flaw in the design. This could be achieved simply by gestures, facial expressions, color enhancements and/or other visual indicators to emphasize a danger level or level of concern. Other possibilities for these asynchronous immersive communications may be for purely entertainment value. The recipient of these asynchronous immersive communications may become immersed within the communication by wandering around the communication to better understand the situation. Those skilled in the art will recognize that this is only one example of an asynchronous immersive communication and that the possibilities of their content and the experiences that may be had are limitless.

The content for the asynchronous immersive communications can be created by using one of many known technologies. For example, both COLLADA and X3D, which are royalty-free open standards that use XML schema technology, can be used to represent three-dimensional content. In particular, COLLADA represents rich data in multiple forms to enable the transformation of assets as they journey from content tools that use higher level description paradigms to applications that require platform-specific optimized descriptions and X3D focuses on the visualization of three dimensional assets within applications by specifying behaviors and interactions. Additional background material on COLLADA and X3D is provided in a white paper titled "Developing Web Applications with COLLADA and X3D" by Rémi Amaud of Sony Computer Entertainment and Tony Parisi of Media Machines, Inc., Mar. 25, 2007 (http://www.khronos.org/collada/presentations/Developing_Web_Applications_with_COLLADA_and X3D.pdf).

The content of the created asynchronous immersive communications is embodied in a data structure that may vary depending on the desires of the creator. In one embodiment, the data structure maintains information for each frame of the asynchronous immersive communication such as the universally unique identifier (UUID) of all avatars within the frame, texture UUIDs associated with each avatar at time of recording, absolute location of each avatar within the frame, location of all items/objects within the frame, texture UUIDs associated with each item/object at time of recording the communication. This information is usually needed for every frame in the asynchronous immersive communication. The creator can further apply known compression techniques to reduce storage size for the asynchronous immersive communication and eliminate duplicate information between frames.

An asynchronous immersive communication database 82 is configured to store the asynchronous immersive communications created by residents of the virtual universe. In particular, the asynchronous immersive communication database 82 receives the communications upon receipt by the communications receiving component 80. In addition to storing the asynchronous immersive communications, the database 82 is configured to store other information such as the preferred method of delivery, receipt, and access; a password that the recipient must enter to enter the immersive world; and tags for items in the communication that may be detached to a user's inventory.

The asynchronous immersive communication may also have indicators as to whether the communication may persist for a number of days or whether it may be copied and forwarded to others. As to the indicator of a preferred method of delivery and receipt and access, this may refer to the recipient's viewing of the communication in a visually distinguishable view port (e.g., section of the viewing screen) versus access via a teleport (e.g., an invitation for the recipient to teleport into the communication as the user may typically do when navigating the virtual universe.). For example, the sender of the immersive communication may prefer that the user teleport into the asynchronous immersive communication and this preference may be stored in the database.

If an item in the immersive communication is tagged (e.g., labeled) to indicate that it may be detached, this may be visually conveyed to the recipient. For example, if the immersive communication contains the three-dimensional representation of a pet that is detachable, the pet may blink or have other distinguishing graphical characteristics, and the recipient may place the pet in his inventory using prior art methods of placing virtual universe items in an inventory. These tags may also be stored in the database.

FIG. 5 shows that the asynchronous immersive communications tool 53 further comprises an access coordination component 84 configured to ascertain the access permissions designated by the residents which indicate how the intended recipients can access the immersive communications. As mentioned above, a resident can configure their asynchronous immersive communication to be accessed via a teleportation to a specified region within the virtual universe 12, a specialized view port in the virtual universe client 24 that is visually distinguishable from its main graphical user interface used by residents to interact with the virtual universe, through a recipient's inventory, or through a communication sent outside of the virtual universe. In another embodiment, the resident creating the asynchronous immersive communication can designate restrictions on recipients that can access the asynchronous immersive communication. For example, there may be a need to use confidential objects such as documents or charts in the communication and thus the user could use cryptographic keys (i.e., public keys and private keys) to limit the exchange of information.

A transmission component 86 as shown in FIG. 5 is configured to transmit the asynchronous immersive communications to the recipients in accordance with the ascertained access permissions. In one embodiment, the transmission component 86 generates a teleport invitation to the recipient that will bring the recipient upon acceptance to a specified virtual region within the virtual universe to access the asynchronous immersive communication. Teleports are common in virtual universes and as mentioned above, allow avatars to make transitions from one virtual region of the virtual universe 12 to another. In this embodiment, the teleports would be to the prerecorded asynchronous immersive communications, which would then be rendered to the recipient upon acceptance. For example, upon acceptance, the recipient would become immersed in the asynchronous immersive communication and be able to walk around in the scene, view it from different angles, and receive inventory items (or other attachments) that may have been associated with the communication as specified by the sender. For example, the sender may have marked a piece of geometry (e.g. an artwork) as detachable so that the recipient may detach it to his or her inventory.

In another embodiment, the transmission component 86 is configured to place the asynchronous immersive communication in a view port of the virtual universe client 24. In this embodiment, the sender of the asynchronous immersive communication sends a pointer to the created communication to the intended recipient(s). The recipient(s) receives the pointer and accesses the asynchronous immersive communication to which the pointer points through the view port. As an alternative, it is possible that the content may be transmitted to the virtual universe client 24 and preemptively buffered there. Another possibility is to transmit only a skeleton of the message in the asynchronous immersive communication and allow the content to be downloaded from the server in real time to enable the playback experience.

The transmission component 86 is further configured to detach at least one object from the asynchronous immersive communication and put that in the inventory of the recipient for subsequent use. In addition, it is possible for the transmission component 86 to place the entire asynchronous immersive communication in a recipient's inventory. In one example of this embodiment, the recipients could receive a message indicating that objects from an asynchronous immersive communication or the entire communication itself has been placed in their inventory and can be accessed and downloaded from the server containing the inventories. Those skilled in the art will recognize that this is only an example and that there are other scenarios in how the asynchronous immersive communications can be used with a resident's inventory.

In still another embodiment, the transmission component 86 is further configured to send the asynchronous immersive communications to the recipients outside of the virtual universe. In this embodiment, the asynchronous immersive communication would take the form of a two-dimensional movie that is in a format such as MPEG or AVI.

To send the asynchronous immersive communications to recipients outside of the virtual universe in the form of a two-dimensional movie, the transmission component 86 has to send the message in a particular transfer protocol that will be recognized by the client that is used outside of the virtual universe. Those skilled in the art will recognize that the transfer protocol would include an agreed-upon protocol and accompanying send and receive system that virtual universes could license and/or use, for example from a third party.

In one embodiment, the transfer of asynchronous immersive communications to recipients having addresses outside the virtual universe 12 such as to email or instant messaging accounts begins optionally with the sender choosing a "camera" view point for the asynchronous immersive communication. Another option is that a default view point could be set. An additional option is to have the sender choose a "frame rate" for the communication (e.g., one still frame per second or one static frame representing entire asynchronous immersive communication but with superimposed text, etc.). Next, known video capture techniques are used to convert asynchronous immersive communications to a video, graphic, or set of graphics. The converted asynchronous immersive communication is placed in an attachment format to an Simple Mail Transport Protocol (SMTP) server within the virtual universe 12 that may route mail outside of the universe. Alternatively, it may be routed as a multimedia file to an instant messaging message via a proxy client within the virtual universe that may route instant messages outside of the universe. If the asynchronous immersive communication fails to deliver, known methods within the SMTP or instant messaging servers can be used to retry failed transmissions, ensure delivery, etc.

In scenarios, where cryptographic keys are used, individual elements within the asynchronous immersive communication may for example be tagged as private or public, so that sending a message out may result in only partial rendering. For example, consider that certain confidential objects, such as documents or charts, are encoded with an encryption key, so that rendering them requires that the avatar be cross certified with the server. When the client software tries to render an asynchronous immersive communication, it may query the issuing server and present its public key. If the server detects that the client software has been certified by the server, it then provides the key required to decode the encrypted document. If the server detects that the client software is not certified, then it denies the key request so the sensitive objects (e.g. personal, private, or confidential) are not rendered.

In another embodiment of this invention, the asynchronous immersive communications tool 53 is used as a service to charge fees for conveying asynchronous immersive communications. In this embodiment, the provider of the virtual universe or a third party service provider could offer this asynchronous immersive communications tool 53 as a service by performing the functionalities described herein on a subscription and/or fee basis. In this case, the provider of the virtual universe or the third party service provider can create, deploy, maintain, support, etc., the asynchronous immersive communications tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to convey asynchronous immersive communications. In this case, the asynchronous immersive communications tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
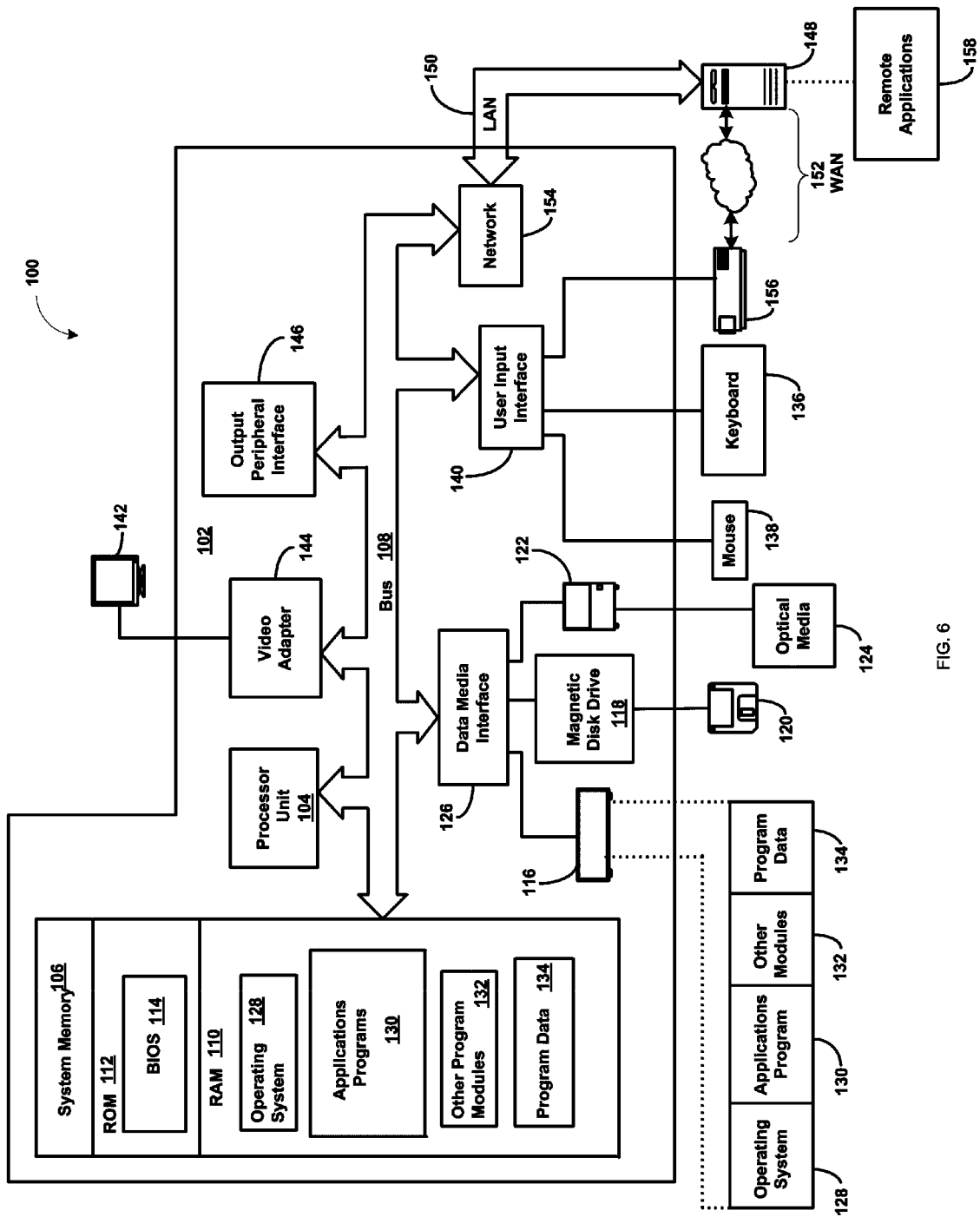
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 6.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 6, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the asynchronous immersive communications tool 53.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing asynchronous immersive communications in a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for transmitting an asynchronous immersive communication in a virtual universe, comprising:

receiving an asynchronous immersive communication created by a resident of a virtual universe, the asynchronous immersive communication containing content therein that forms a three-dimensional rendering of avatars and objects within the virtual universe along with software scripts that control their behavior in the rendering and that allows immersion within the content and interaction therewith, wherein the content of the asynchronous immersive communication is embodied in a data structure that maintains information of each frame forming the asynchronous immersive communication, the information including an avatar identifier that identifies each avatar in the frame, a texture identifier that identifies a texture associated with each avatar in the frame at a time that the asynchronous immersive communication was created, location of each avatar in the frame, location of all other objects in the frame that are part of the asynchronous immersive communication and an object texture identifier that identifies a texture associated with each object in the frame at the time that the asynchronous immersive communication was created, the asynchronous immersive communication further including a plurality of indicators associated therewith that each correspond with handling of the asynchronous immersive communication by a recipient, the plurality of indicators comprising a time of existence indicator that indicates a time length that the asynchronous immersive communication may be in existence before the recipient will no longer be able to access the asynchronous immersive communication, an asynchronous immersive communication forwarding indicator that indicates whether the asynchronous immersive communication can be copied by the recipient and forwarded to other residents within the virtual universe, and an asynchronous immersive communication access indicator that indicates a preferred method of accessing the asynchronous immersive communication that is specified by the resident that created the asynchronous immersive communication;

transmitting the asynchronous immersive communication with the content embodied in the data structure that forms the asynchronous immersive communication directly to the recipient; and enabling the recipient to directly access the transmitted asynchronous immersive communication including the content that forms the asynchronous immersive communication in accordance with the plurality of indicators that specify handling of the asynchronous immersive communication by the recipient.

2. The method according to claim 1, wherein the enabling comprises generating a teleport invitation to the recipient that will bring the recipient upon acceptance to a specified virtual region.

3. The method according to claim 1, wherein the enabling comprises placing the asynchronous immersive communication in a view port that is visually distinguished from a main graphical user interface used by the recipient to access the virtual universe.

4. The method according to claim 1, wherein the enabling comprises detaching at least one object from the asynchronous immersive communication in an inventory of the recipient that is associated with the virtual universe for access thereto.

5. The method according to claim 1, wherein the enabling comprises placing the entire asynchronous immersive communication in an inventory of the recipient that is associated with the virtual universe for access thereto.

6. The method according to claim 1, wherein the enabling comprises sending the asynchronous immersive communication to the recipient outside of the virtual universe for access thereto.

7. The method according to claim 1, further comprising designating restrictions on recipients that can access the asynchronous immersive communication.

8. The method according to claim 1, further comprising storing the received asynchronous immersive communication.

9. The method according to claim 1, further comprising charging a service fee for transmitting the asynchronous immersive communication to the recipient.

10. A computer system that transmits an asynchronous immersive communication in a virtual universe, comprising:

at least one processing unit;

memory operably associated with the at least one processing unit; and an asynchronous immersive communications tool storable in memory and executable by the at least one processing unit, the tool comprising:

a communications receiving component configured to receive an asynchronous immersive communication created by a resident of a virtual universe, the asynchronous immersive communication containing content therein that forms a three-dimensional rendering of avatars and objects within the virtual universe along with software scripts that control their behavior in the rendering and that allows immersion within the content and interaction therewith, wherein the content of the asynchronous immersive communication is embodied in a data structure that maintains information of each frame forming the asynchronous immersive communication, the information including an avatar identifier that identifies each avatar in the frame, a texture identifier that identifies a texture associated with each avatar in the frame at a time that the asynchronous immersive communication was created, location of each avatar in the frame, location of all other objects in the frame that are part of the asynchronous immersive communication and an object texture identifier that identifies a texture associated with each object in the frame at the time that the asynchronous immersive communication was created, the asynchronous immersive communication further including a plurality of indicators associated therewith that each correspond with handling of the asynchronous immersive communication by a recipient, the plurality of indicators comprising a time of existence indicator that indicates a time length that the asynchronous immersive communication may be in existence before the recipient will no longer be able to access the asynchronous immersive communication, an asynchronous immersive communication forwarding indicator that indicates whether the asynchronous immersive communication can be copied by the recipient and forwarded to other residents within the virtual universe, and an asynchronous immersive communication access indicator that indicates a preferred method of accessing the asynchronous immersive communication that is specified by the resident that created the asynchronous immersive communication;

an access coordination component configured to ascertain an access permission designated by the resident for the recipient specified to receive the asynchronous immersive communication in accordance with the plurality of indicators that specify handling of the asynchronous immersive communication by the recipient; and a transmission component configured to directly transmit the asynchronous immersive communication with the content embodied in the data structure that forms the asynchronous immersive communication to the recipient with the access permission ascertained by the access coordination component.

11. The system according to claim 10, further comprising an asynchronous immersive communication database configured to store asynchronous immersive communications.

12. The system according to claim 10, wherein the transmission component is configured to generate a teleport invitation to the recipient that will bring the recipient upon acceptance to a specified virtual region.

13. The system according to claim 10, wherein the transmission component is configured to place the asynchronous immersive communication in a view port that is visually distinguished from a main graphical user interface used by the recipient to access the virtual universe.

14. The system according to claim 10, wherein the transmission component is configured to detach at least one object from the asynchronous immersive communication in an inventory of the recipient that is associated with the virtual universe for access thereto.

15. The system according to claim 10, wherein the transmission component is configured to place the entire asynchronous immersive communication in an inventory of the recipient that is associated with the virtual universe for access thereto.

16. The system according to claim 10, wherein the transmission component is configured to send the asynchronous immersive communication to the recipient outside of the virtual universe for access thereto.

17. A computer-readable storage device storing computer instructions, which when executed, enables a computer system to transmit an asynchronous immersive communication in a virtual universe, the computer instructions comprising:

receiving an asynchronous immersive communication created by a resident of a virtual universe, the asynchronous immersive communication containing content therein that forms a three-dimensional rendering of avatars and objects within the virtual universe along with software scripts that control their behavior in the rendering and that allows immersion within the content and interaction therewith, wherein the content of the asynchronous immersive communication is embodied in a data structure that maintains information of each frame forming the asynchronous immersive communication, the information including an avatar identifier that identifies each avatar in the frame, a texture identifier that identifies a texture associated with each avatar in the frame at a time that the asynchronous immersive communication was created, location of each avatar in the frame, location of all other objects in the frame that are part of the asynchronous immersive communication and an object texture identifier that identifies a texture associated with each object in the frame at the time that the asynchronous immersive communication was created, the asynchronous immersive communication further including a plurality of indicators associated therewith that each correspond with handling of the asynchronous immersive communication by a recipient, the plurality of indicators comprising a time of existence indicator that indicates a time length that the asynchronous immersive communication may be in existence before the recipient will no longer be able to access the asynchronous immersive communication, an asynchronous immersive communication forwarding indicator that indicates whether the asynchronous immersive communication can be copied by the recipient and forwarded to other residents within the virtual universe, and an asynchronous immersive communication access indicator that indicates a preferred method of accessing the asynchronous immersive communication that is specified by the resident that created the asynchronous immersive communication;

transmitting the asynchronous immersive communication with the content embodied in the data structure that forms the asynchronous immersive communication directly to the recipient; and enabling the recipient to directly access the transmitted asynchronous immersive communication including the content that forms the asynchronous immersive communication directly in accordance with the plurality of indicators that specify handling of the asynchronous immersive communication by the recipient.

18. The computer-readable storage device according to claim 17, wherein the enabling comprises instructions for generating a teleport invitation to the recipient that will bring the recipient upon acceptance to a specified virtual region.

19. The computer-readable storage device according to claim 17, wherein the enabling comprises instructions for placing the asynchronous immersive communication in a view port that is visually distinguished from a main graphical user interface used by the recipient to access the virtual universe.

20. The computer-readable storage device according to claim 17, wherein the enabling comprises instructions for detaching at least one object from the asynchronous immersive communication in an inventory of the recipient that is associated with the virtual universe for access thereto.

21. The computer-readable storage device according to claim 17, wherein the enabling comprises instructions for placing the entire asynchronous immersive communication in an inventory of the recipient that is associated with the virtual universe for access thereto.

22. The computer-readable storage device according to claim 17, wherein the enabling comprises instructions for sending the asynchronous immersive communication to the recipient outside of the virtual universe for access thereto.

23. The computer-readable storage device according to claim 17, further comprising instructions for storing the received asynchronous immersive communication.

24. A method for deploying an asynchronous immersive communications tool for use in a computer system that transmits an asynchronous immersive communication, comprising:

providing a computer infrastructure operable to:

receive an asynchronous immersive communication created by a resident of a virtual universe, the asynchronous immersive communication containing content therein that forms a three-dimensional rendering of avatars and objects within the virtual universe along with software scripts that control their behavior in the rendering and that allows immersion within the content and interaction therewith, wherein the content of the asynchronous immersive communication is embodied in a data structure that maintains information of each frame forming the asynchronous immersive communication, the information including an avatar identifier that identifies each avatar in the frame, a texture identifier that identifies a texture associated with each avatar in the frame at a time that the asynchronous immersive communication was created, location of each avatar in the frame, location of all other objects in the frame that are part of the asynchronous immersive communication and an object texture identifier that identifies a texture associated with each object in the frame at the time that the asynchronous immersive communication was created, the asynchronous immersive communication further including a plurality of indicators associated therewith that each correspond with handling of the asynchronous immersive communication by a recipient, the plurality of indicators comprising a time of existence indicator that indicates a time length that the asynchronous immersive communication may be in existence before the recipient will no longer be able to access the asynchronous immersive communication, an asynchronous immersive communication forwarding indicator that indicates whether the asynchronous immersive communication can be copied by the recipient and forwarded to other residents within the virtual universe, and an asynchronous immersive communication access indicator that indicates a preferred method of accessing the asynchronous immersive communication that is specified by the resident that created the asynchronous immersive communication;

transmit the asynchronous immersive communication with the content embodied in the data structure that forms the asynchronous immersive communication directly to the recipient; and enable the recipient to directly access the transmitted asynchronous immersive communication including the content that forms the asynchronous immersive communication directly in accordance with the plurality of indicators that specify handling of the asynchronous immersive communication by the recipient.

\* \* \* \* \*